3,197,318
2-METHYLENEMALONIC ACID ESTER
CONTACT ADHESIVE COMPOSITIONS
Benjamin D. Halpern, Jenkintown, Jack Dickstein, Elkins Park, and George Kitazawa, Fairless Hills, Pa., and Rose-Marie Hoegerle, Linden, N.J., assignors to The Borden Company, New York, N.Y., a corporation of New Jersey
No Drawing. Filed Nov. 7, 1960, Ser. No. 67,454
5 Claims. (Cl. 106—208)

This invention relates to esters of 2-methylenemalonic acid.

These esters are particularly useful in making contact adhesives for adhering glass, metal or the like and particularly for surfaces that are relatively non-absorptive of the adhesive. Such adhesives effect bonding of the plied surfaces without sustained compression in assembly and without being heated to develop the bond.

Our esters, when used as the base material, provide adhesive compositions which avoid the disadvantages of instability or premature setting of the adhesive before the application to the surfaces to be bonded and that give quickly the desired bond. In representative preparations and tests we have found stability ranging from 16 hours up to 2 months or longer in storage but a time of setting, when applied between glass surfaces, for example, of 4–35 minutes.

Briefly stated the invention comprises the herein described esters of 2-methylenemalonic acid having 4–18 carbon atoms in each hydrocarbon radical that replaces a hydrogen of the carboxyl groups of the said acid. The radicals when having as many as 4 carbons improve the stability of the contact adhesive over that obtained with the lower esters such as the dimethyl or diethyl 2-methylenemalonate and provide internal plasticization of the product.

The invention comprises also the di-$C_1$–$C_3$ dialkyl 2-methylenemalonic acid esters in externally plasticized compositions for use as contact adhesives and suitably also with an acidic inhibitor to lengthen the pot life during which the adhesive may be held without premature setting or gelling, i.e., before application to the surfaces to be bonded.

Our new esters are of the formula $CH_2=C(COOR)_2$, R in this formula being a monovalent $C_4$–$C_{18}$ hydrocarbon radical. Examples of R are n-, iso- and t-butyl, and any amyl, hexyl, octyl, dodecyl and octodecyl radicals; allyl; methallyl; cyclopentyl; cyclohexyl; and phenyl.

The external plasticizer, when used is a substantially non-volatile solvent for and compatible hot or cold with the 2-methylenemalonate ester and is chemically non-reactive therewith. Generally satisfactory are the plasticizers for polyvinyl chloride, e.g., dibutyl, dioctyl, didodecyl, and diethoxyethyl phthalates, adipates, and sebacates; tricresyl phosphate, glycerine triacetate; and methyl ricinoleate.

Also we use a viscosity increasing or thickening agent, particularly when the methylenemalonate ester used is one that is very fluid, i.e., the methyl or ethyl which used alone are so low in viscosity as to make the adhesive too spreadable and too flowable from the joint between the surfaces to be bonded, when they are pressed together even lightly and for a short interval of time with the adhesive therebetween.

As the viscosity increasing agent, we use an inert non-volatile material dispersible in the methylenemalonate ester, as, for instance, one of the class represented by polyoxyethylene of average molecular weight about 1,000–500,000 (a Carbowax, Polyox WSR–35 or Polyox WSR–205), polyethylene glycol of average molecular weight about 150–500 and a vegetable gum such as karaya, locust bean or guar gum.

The inhibitor or stabilizer used is acidic. It may be, for example, an acidic oxide, phenol, an alkyl substituted phenol, or a Lewis acid such as boron trifluoride etherate. Examples are any of the nitrogen, sulfur and phosphorus oxides, phenol, cresol, $C_1$–$C_4$ substituted phenol, cresol and catechol, and acrylhydroxyamic acid.

Proportions of the various components of our contact adhesive that are permissible and also those that we ordinarily use for best results are shown in the following table, proportions here and elsewhere herein being expressed as parts by weight unless specifically stated to the contrary.

| Component | Parts by Weight for 100 Parts of the Methylenemalonate Ester | |
|---|---|---|
| | Permissible | For Best Results |
| Viscosity increasing agent | 0–5 | [1] 0.02–3 |
| External plasticizer | 0–30 | [1] 1–10 |
| Inhibitor (acidic stabilizer) | 0–1.5 | 0.1–1.5 |

[1] Helpful particularly when the said ester used is dimethyl or diethyl

The proportion of the viscosity increasing agent is less within the range stated when the viscosity of the said agent, in a solution of given concentration, is higher. Thus the proportion of the Polyox WSR–35 used would be only about 0.02–0.05 part for 100 of the methylenemalonate ester and the proportion of the Polyox WSR–250 somewhat less.

The proces of making the new compounds in general is as follows.

There is first made or purchased the intermediate which is the diester of malonic acid of the formula $$CH_2=(COOR)_2$$ 

in which R has the meaning above and represents the monovalent hydrocarbon radical or group that is to appear in the finished products. This ester is made in a usual manner, by esterifying malonic acid with 2 moles of the alcohol which contains the radical R. This esterification is made ordinarily with a moderate excess of the alcohol ROH, 1% or so of an acid catalyst such as toluene sulfonic acid, azeotroping out water as formed by fractionation with an added immiscible liquid such as toluene, and then distilling away remaining low boiling material such as the excess of alcohol.

The acid catalyst is neutralized to advantage by adding the theoretical quantity of sodium carbonate, calcium carbonate or the like before the distillation of volatiles is undertaken. The residue is the malonic acid ester intermediate to be used in our process.

The diester of malonic acid so made is then converted to the ester of 2-methylenemalonic acid. The malonic acid ester is mixed with a source of formaldehyde such as paraformaldehyde or anhydrous formaldehyde dissolved in acetic acid, the acetic acid having dissolved therein (1) an acetate of a heavy metal, such as zinc or copper, as condensing agent and (2) acetic anhydride as an acceptor for water. Heating is applied, as under a reflux condenser, until the content of unreacted formaldehyde ceases to fall substantially. This can be determined by analysis. Actually we learn, from a few representative runs, the approximate time required and stop the heating shortly after this minimum time requirement.

Then the mixture is subjected to distillation, first at a reduced pressure of 20–50 mm., to remove volatilizable materials such as any remaining formaldehyde, acetic acid or acetic anhydride and leave the desired methylenemalonic acid ester in the residue. The catalyst, such as the zinc compound, which will be insoluble, is then filtered from the said residue, after warming if necessary to lower the viscosity of the suspension. The residue which passes through the filter is subjected to vacuum distillation, to give the distilled diester of the 2-methylenemalonic acid.

We use at least 1 mole of formaldehyde and ordinarily an excess, to promote utilization of the more expensive malonic acid ester, as for example about 1.3–3 moles of the formaldehyde to 1 mole of the malonic acid ester.

The process of making the 2-methylenemalonic acid esters is illustrated by the following specific examples.

EXAMPLE 1.—DIMETHYL 2-METHYLENEMALONATE 11.9 parts by weight of zinc acetate dihydrate and 5.5 of acetic anhydride constituting the condensing and water accepting agents, respectively, were mixed into 210 parts of glacial acetic acid and the resulting mixture maintained at 70°–80° C. for 2.5 hours and then cooled to 50° C. There were then admixed 30 parts of paraformaldehyde (corresponding to 1 mole of formaldehyde) and next 66 parts of dimethyl malonate (0.5 mole). The whole was then warmed to about 100° C. and stirred at 100°–110° C. for 4 hours under a reflux condenser. The reaction was substantially complete.

The whole was then subjected to distillation at a pressure of 20–50 mm. until the remaining volatiles were distilled including any unreacted formaldehyde in its then form and acetic acid.

The residue was then filtered and the filtrate vacuum distilled at 1.25 mm. of mercury pressure. The fraction boiling at 51°–53° C. is dimethyl 2-methylenemalonate.

EXAMPLE 2.—DIALLYL 2-METHYLENEMALONATE 2.9 parts of zinc acetate dihydrate and 1.4 parts of acetic anhydride were stirred with 55 parts of glacial acetic acid at 77° C. for 2.5 hours and then cooled to room temperature. There were then added 46 parts of diallyl malonate (0.25 mole) and 7.5 parts of paraformaldehyde (0.25 mole of formaldehyde). The reaction mixture was warmed to 100° C. and maintained at that point for 2.5 hours, with stirring until the stirring had to be discontinued because of the formation of a colorless gel. The volatilizables were distilled off as before at atmospheric temperature. The colorless residue that remained was heated and vacuum distilled into two fractions. The first fraction of boiling point 62°–77° C. at 0.75 mm. was principally diallyl malonate. The second fraction which distilled at 84°–90° C. at 0.45 mm. was the desired diallyl 2-methylenemalonate. While this fraction is subject to purification by further processing, as by redistillation in vacuo, such further purification is not necessary for use of the fraction in the contact adhesive.

EXAMPLE 3.—OTHER ESTERS

The procedure and composition of Example 1 are used except that the dimethyl malonate there used was replaced by each of the other di-$C_1$–$C_{18}$ alkyl, diallyl, dimethallyl, dicyclopentyl, dicyclohexyl, and diphenyl esters of malonic acid, each used separately and in turn.

EXAMPLE 4.—ESTERS OF POLYOLS

In another modification of this Example 1, the methyl groups in the malonate there used is replaced by an equivalent weight (from the valence stand point) of the hydrocarbon group of glycol, glycerol, pentaerythritol, bisphenol A (di-p-hydroxylphenyl propane), or like polyhydroxy organic compound containing 2–18 carbon atoms to the molecule in the malonic ester. These diesters are made by warming a mole of malonic acid with an equivalent weight of the selected polyol and about 0.1% of admixed p-toluene sulfonic acid with elimination of the by-product water as formed and then neutralization of the catalyst with an equivalent weight of precipitated calcium carbonate, all by conventional techniques.

In a modification of Example 4, the proportion of the selected polyol is reduced to half the equivalent weight. The products obtained are partial esters only of the malonic acid. They contain carboxyl groups available for further reaction, as with another of the alcohols or polyols shown herein.

The use of the polyols, these being polyfunctional, with the polyfunctional malonic acid increases the cross-linking properties of the resulting complete or partial esters.

All of the 2-methylenemalonate diesters made as described herein are liquids either at ordinary or at moderately elevated temperatures. Those diesters containing not more than 4 carbon atoms per alkyl group in the finished methylenemalonate ester are liquids even at room temperatures.

Those with at least 4 carbon atoms to each R in the formula first given above are internally plasticized so that additional plasticizer need not be admixed for most uses of the ester in contact adhesives.

Finally these esters can be mixed into contact adhesives and kept with admixed acidic inhibitors without curing or setting for reasonable periods of time, in some cases up to 2 months or more, but will cure rapidly between surfaces of glass, metal or the like, as shown in the table later herein. The set films are clear and practically colorless. Glass sandwiches made with our contact adhesives are clear and transparent.

Specifically we consider an important factor in the setting up between the glass or like surfaces to be the moisture which is occluded on the surfaces to be adhered or which enters the adhesive film as it is spread or through the edge of the glue line where the adhesive is exposed. In the anhydrous composition, in which we make, handle and apply our adhesive, on the other hand, this setting up either fails to occur or is greatly delayed by the inhibitor up to the time when the effectiveness of the inhibitor is reduced by contact of moisture therewith.

EXAMPLE 5.—CONTACT ADHESIVES

A contact adhesive is made of the following composition.

| Component: | Parts by weight |
|---|---|
| Dimethyl 2-methylenemalonate | 100 |
| Polyethylene glycol (average M.W. 150–500) | 3 |
| Dioctyl phthalate (plasticizer) | 2 |
| t-Butylcatechol (inhibitor) | 1 |

Various inhibitors can and have been used by us. The effect of these inhibitors in stabilizing the contact adhesives, so as to prevent premature setting up (polymerization), and also on the rate of setting of the adhesives between glass plates is shown in the following table.

In this table the gases nitrogen and sulfur oxides, when used, were introduced in amounts to saturate the dimethyl 2-methylenemalonate. The phosphorus pentoxide when used in small amounts dissolves in the diesters. The alkyl substituted catechol was used in the percentage shown on the weight of the dimethyl 2-methylenemalonate.

*Stabilization of esters of 2-methylenemalonic acid*

| Ester Used | Inhibitor | Temp. of Storage, °C. | Time Before Polymerization in Bulk | Time Before Polymerization Between Glass Plates, min. |
|---|---|---|---|---|
| Dimethyl | NO | 5 | 6 days | 4 |
| Do | NO | 20 | 2 days | 4 |
| Do | SO₂ | 5 | 2 months plus | 35 |
| Do | SO₂ | 20 | 3 days | 35 |
| Diethyl | t-Bu-catechol, 1.0%. | 5 | 5 days | 25 |
| Do | t-Bu-catechol, 1.5%. | 5 | 26 hours | 20 |

EXAMPLE 6

The procedure and composition of Example 5 are used except that the polyethylene glycol there used is replaced in turn by an equal weight of polyoxyethylene of average molecular weight about 1,000–500,000 and karaya, locust bean, and guar gums.

EXAMPLE 7

The procedure and composition of Example 5 are used except that the dioctyl phthalate there used is replaced by an equal weight of each of the other plasticizers disclosed herein, used separately and in turn.

EXAMPLE 8

The procedure and the contact adhesive composition of Example 5 are used except that the dimethyl 2-methylenemalonate there used is replaced in turn by an equal weight of any of the esters disclosed in Examples 3 and 4 and the thickener and plasticizer are omitted.

It will be understood that it is intended to cover all changes and modifications of the examples of the invention herein chosen for the purpose of illustration which do not constitute departures from the spirit and scope of the invention.

We claim:

1. A substantially anhydrous moisture activated contact adhesive consisting essentially of a 2-methylenemalonate ester of the formula $CH_2=C(COOR)_2$, in which R is an equivalent weight of an unsubstituted hydrocarbon radical having 4–18 carbon atoms and an admixed substantially anhydrous and a substantially non-volatile solvent for said ester, said solvent being compatible with and chemically non-reactive with said ester both hot and cold, being admixed in the proportion of about 1–30 parts for 100 parts of the ester, and serving as a plasticizer therefor.

2. The contact adhesive of claim 1, said solvent being selected from the group consisting of dibutyl, dioctyl, didodecyl, and diethoxyethyl phthalates, adipates and sebacates; tricresyl phosphate; glycerine triacetate; and methyl ricinoleate.

3. A contact adhesive comprising the composition of claim 1 and a viscosity increasing agent dispersed in the said composition in the proportion of about 0.02–3 parts by weight for 100 parts of the said ester being selected from the group consisting of polyoxyethylene of average molecular weight about 1,000–500,000, a polyethylene glycol of average molecular weight about 150–500, and karaya, locust bean and guar gums.

4. The contact adhesive of claim 3 including an inhibitor admixed therewith in the proportion of 0.1–1.5 parts by weight for 100 parts of the ester in the said composition, the inhibitor being selected from the group consisting of the oxides of nitrogen, sulfur and phosphorus, phenols, alkyl substituted phenols, and acrylhydroxamic acid.

5. The contact adhesive of claim 3, including phosphorus pentoxide admixed as an inhibitor in the proportion of 0.1—1.5 parts by weight for 100 parts of the ester in the said composition.

References Cited by the Examiner

UNITED STATES PATENTS

| | | | |
|---|---|---|---|
| 2,145,195 | 1/39 | Bauer et al. | 106—205 |
| 2,293,309 | 8/42 | Roblin | 260—485 |
| 2,313,501 | 3/43 | Bachman et al. | 260—485 |
| 2,330,033 | 9/43 | D'Alelio | 260—485 |
| 2,847,383 | 8/58 | Airs et al. | 260—485 |
| 2,899,464 | 8/59 | Teague | 260—485 |
| 3,056,817 | 10/62 | Werber et al. | 260—485 |

MORRIS LIEBMAN, *Primary Examiner.*

JOSEPH REBOLD, LEON J. BERCOVITZ, *Examiners.*